H. Daniels.
Combing Mach.
N° 93,811.                                                  Patented Aug. 17, 1869.
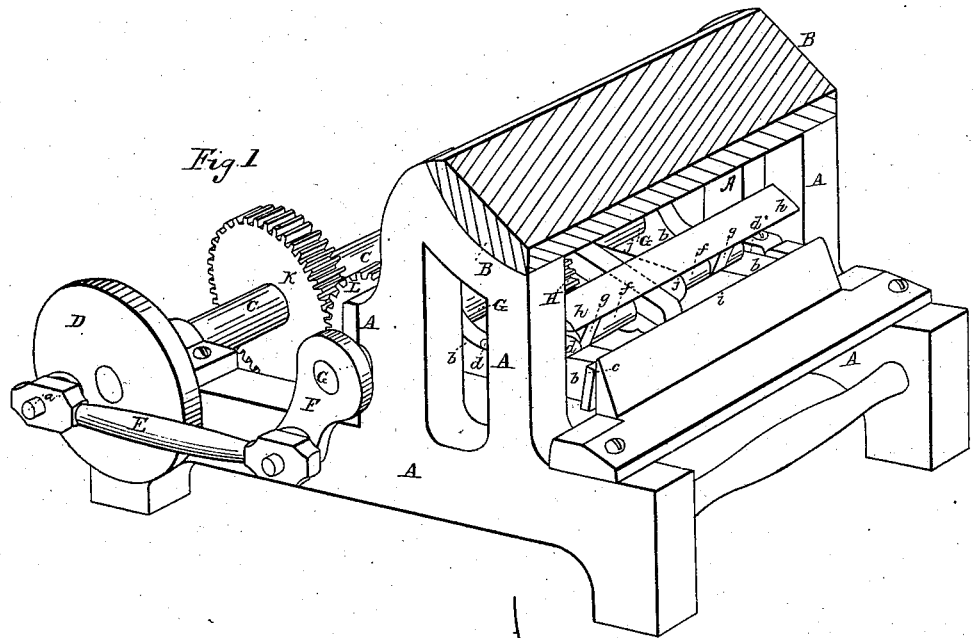
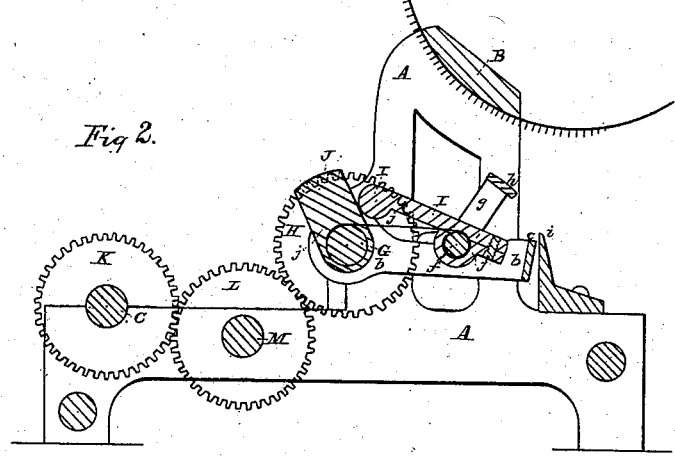
Witnesses.                                                  Inventor.
                                                            Horace Daniels.
                                                            By atty. A. B. Stoughton.

United States Patent Office.

HORACE DANIELS, OF PAWTUCKET, RHODE ISLAND.

*Letters Patent No. 93,811, dated August 17, 1869.*

IMPROVEMENT IN MECHANISM FOR OPERATING THE NIPPERS OF COMBING-MACHINES.

The Schedule referred to in these Letters Patent and making part of the same.

*To all whom it may concern:*

Be it known that I, HORACE DANIELS, of Pawtucket, in the county of Providence, and State of Rhode Island, have invented certain new and useful Improvements in Mechanism for Operating the Nipper-Jaw in Cotton-Combing Machines; and I do hereby declare the following to be a full, clear, and exact description of the same, reference being had to the accompanying drawings, making a part of this specification, in which—

Figure 1 represents, in perspective, so much of a cotton-combing machine as will illustrate my invention, and Figure 2 represents a vertical longitudinal section through the same.

Similar letters of reference, where they occur in the separate figures, denote like parts of the machine in both of the drawings.

My invention consists in the mechanism for operating the nipper-jaw in cotton-combing machines, whereby a very simple and efficient means of accomplishing this object is obtained.

To enable others skilled in the art to make and use my invention, I will proceed to describe the same in connection with the drawings.

A represents a portion of the frame, and B, a portion of the main cylinder or doffer of any known combing-machine, and sufficient in detail to illustrate the application of my invention thereto.

On the main driving, or any other suitable rotating shaft C, of the cotton or other fibre-combing machine, there is a crank or wrist-wheel, D, to the wrist $a$, on which, one end of a connecting-rod, E, is attached, the other end of said rod being attached to a crank-arm, F, on the shaft G, which shaft carries the nippers, and vibrates them between the feeding-point, where they take a tuft of cotton, or other material to be combed, and the cylinder B, where the tuft is delivered to be afterward operated upon as is common in machines for this purpose.

The shaft G receives a rocking motion only from its connections, and not a continuously-rotating motion, but the gear-wheel H on said rocking shaft has a continuous rotary motion on and sometimes with the shaft, as will be explained.

The nippers are arranged on the shaft G as follows:

Arms $b\ b$ are permanently arranged on the shaft G, near its ends, but inside of the main frame A, and upon the outer ends of these arms, and extending from one to the other, is permanently arranged one of the nipper-jaws $c$.

In bearings $d$ on said arms $b\ b$, the journals of a rocking shaft, $f$, are arranged, and can turn while the said shaft travels with said arms.

Upon this rocking-shaft $f$ there are arms $g$, upon the ends of which, and extending from one to the other, and beyond them, is arranged the hinged or working-jaw $h$ of the nippers; said latter or hinged jaw, when closed, shutting down upon, or nearly upon the edge of its mate or fellow $c$, and both moving and working so as to take the cotton, or other material to be combed, from the feeding-point or edge $i$, and carrying it, as before mentioned, up and delivering it to the cylinder B.

Upon the shaft $f$ is secured a tappet-arm, I, which extends rearward, (calling that the front of the machine where the material is fed in,) so as to come within the path of a cam, J, that is fast to and rotates with the gear H, that is loose on what I have termed the nipper-shaft G, so as to be struck and operated by said cam at every rotation of the gear-wheel H; and from said shaft $f$ to the shaft G, there extends a rubber or other spring, $j$, which is expanded, and partially winds around said shaft, to which its ends are respectively fastened, so that the contraction of said spring may open the hinged jaw $h$, or raise it, after the cam J has closed it, and passed beyond the influence of the tappet I, by which the nipper-jaws were held closed.

On the shaft C, which makes a continuous rotation, there is a gear-wheel, K, which gears with and turns an intermediate gear, L, on a shaft, M, and this intermediate gear works into and gives a continuous motion to the gear H, which of course must be loose on its shaft G, which only rocks, but does not rotate continuously in one and the same direction, as the wheel H does and must do.

It will thus be perceived that the nippers are moved to the point where they take the cotton, or other material to be combed, and then to the cylinder, to deliver it by the rocking shaft G, while the movable jaw of the pair is closed upon the tuft, and held there by the rotation of the gear H and cam J on said shaft, and opened by the reaction of the spring $j$ connected to and partially or wholly encircling the two shafts G and $f$.

Having thus fully described my invention,

What I claim therein as new, and desire to secure by Letters Patent, is—

In combination with a pair of nippers that move in the arc of a circle, for taking and carrying the material to be combed from the feeding-point to the carrying or working-cylinder, the tappet, cam, and spring, all constructed and operating to open and close the hinged jaw of the pair, substantially in the manner herein described and represented.

HORACE DANIELS.

Witnesses:
P. J. GAGE,
THOS. H. NEWKIRK.